US012003209B2

(12) United States Patent
Van Pelt (10) Patent No.: US 12,003,209 B2
(45) Date of Patent: Jun. 4, 2024

(54) PRE-ASSEMBLY BASED INSTALLATION FOR A SINGLE AXIS SOLAR TRACKER

(71) Applicant: Gamechange Solar Corp., Norwalk, CT (US)

(72) Inventor: Scott Van Pelt, Tarrytown, NY (US)

(73) Assignee: Gamechange Solar Corp., Norwalk, CT (US)

( * ) Notice: Subject to any disclaimer, the term of this patent is extended or adjusted under 35 U.S.C. 154(b) by 0 days.

(21) Appl. No.: 17/738,511

(22) Filed: May 6, 2022

(65) Prior Publication Data

US 2023/0308044 A1 Sep. 28, 2023

Related U.S. Application Data

(60) Provisional application No. 63/190,355, filed on May 19, 2021.

(51) Int. Cl.
| | |
|---|---|
| E04C 5/16 | (2006.01) |
| F24S 30/425 | (2018.01) |
| H02S 20/32 | (2014.01) |
| H02S 30/10 | (2014.01) |
| F24S 30/00 | (2018.01) |

(52) U.S. Cl.
CPC ............ H02S 20/32 (2014.12); F24S 30/425 (2018.05); H02S 30/10 (2014.12); *F24S 2030/134* (2018.05); *F24S 2030/15* (2018.05)

(58) Field of Classification Search
CPC .... H02S 20/32; H02S 30/10; F24S 2030/134; F24S 30/425
See application file for complete search history.

(56) References Cited

U.S. PATENT DOCUMENTS

| | | | | | |
|---|---|---|---|---|---|
| 2,913,583 | A | * | 11/1959 | Regnier | G01S 3/7861 136/246 |
| 4,202,321 | A | * | 5/1980 | Volna | F24S 25/70 353/3 |
| 4,205,661 | A | * | 6/1980 | Chapman | F24S 23/30 126/606 |
| 4,515,148 | A | * | 5/1985 | Boy-Marcotte | F24S 23/745 126/696 |
| 2011/0240007 | A1 | * | 10/2011 | Currier | F24S 50/00 126/606 |
| 2014/0338659 | A1 | * | 11/2014 | Corio | F24S 30/428 126/714 |

(Continued)

*Primary Examiner* — Basil S Katcheves
(74) *Attorney, Agent, or Firm* — O'Shea P.C.

(57) ABSTRACT

A method of installing a solar panel assembly that includes a first beam, a second beam and a third beam where the first and second beams are parallelly spaced and perpendicular to the third beam, and further includes a plurality of purlins, a semicircular ring fastened to the third beam, and a plurality of photovoltaic panels between adjacent ones of the plurality of purlins to form the solar panel assembly, the method comprising lifting the solar panel assembly and rotatably attaching it to a post by inserting a pin into a first bore in a flange extending from the third beam and into a second bore in the post, where the first and second bores are coaxial such that the solar panel assembly has a range of rotational motion about the pin, and fastening proximate and distal ends of the first and second beams to distal and proximate ends of adjacent solar panel assemblies.

16 Claims, 12 Drawing Sheets

(56) References Cited

U.S. PATENT DOCUMENTS

| | | | |
|---|---|---|---|
| 2016/0118929 A1* | 4/2016 | Krause | H02S 20/32 |
| | | | 136/246 |
| 2018/0091088 A1* | 3/2018 | Barton | F24S 30/425 |
| 2019/0190440 A1* | 6/2019 | Kingsley | H02S 20/32 |
| 2019/0190445 A1* | 6/2019 | Alderman | H02S 20/32 |
| 2019/0363669 A1* | 11/2019 | Wildman | F24S 25/10 |
| 2020/0403560 A1* | 12/2020 | Casla Urteaga | H02S 10/40 |
| 2021/0021229 A1* | 1/2021 | Dechant | F24S 30/425 |
| 2021/0058025 A1* | 2/2021 | Dechant | F24S 30/425 |
| 2021/0080980 A1* | 3/2021 | Kesler | H02S 20/32 |

* cited by examiner

PRE-ASSEMBLY BASED INSTALLATION FOR A SINGLE AXIS SOLAR TRACKER

CROSS REFERENCE TO RELATED APPLICATIONS

This application claims the benefit of U.S. Provisional Patent Application Ser. No. 63/190,355 filed May 19, 2021, which is hereby incorporated by reference.

BACKGROUND OF THE INVENTION

1. Technical Field

This disclosure relates generally to mounting/racking structures for solar panels, and in particular to a method of assembling a mounting structure for a single axis solar tracker.

2. Background Information

Conventional systems call for a solar panel mounting structure to be fully assembled, piece-by-piece, at its operating position. Then the photovoltaic modules are mechanically secured to the mounting structure, and finally the photovoltaic modules in a row/array are electrically connected. In the case of 2-Up Portrait trackers this installation procedure is particularly onerous as the working height for the mechanical installation and electrical connection of the photovoltaic modules is high in the air, often requiring installation staff performing these steps to use fall protection. The use of fall protection significantly increases the time to perform this work. There is a need for an improved method of assembling a mounting structure for a single axis solar tracker, for example, a method of assembling a mounting structure for a 2-Up Portrait single axis solar tracker.

SUMMARY OF THE DISCLOSURE

According to an aspect of the disclosure, a method of assembling and installing a solar panel assembly comprises positioning a first beam relative to a second beam, where the first beam and the second beam are parallelly spaced; fastening a third beam to and perpendicularly between the first beam and the second beam; fastening a plurality of purlins to and perpendicularly between the first beam and the second beam; fastening a semicircular ring to the third beam, where the semicircular ring includes teeth extending radially away from the third beam; attaching at least one photovoltaic panel between adjacent ones of the plurality of purlins to form the solar panel assembly formed by the first, second and third beams, the plurality of purlins, the semicircular ring and the at least one photovoltaic panel; transporting the solar panel assembly to an installation site; and lifting the solar panel assembly and rotatably attaching it to a post by inserting a pin into a first bore in a flange extending from the third beam and into a second bore in the post, where the first and second bores are coaxial such that the solar panel assembly has a range of rotational motion about the pin.

The fastening the semicircular ring to the third beam may further comprise attaching a first end of the semicircular ring to the third beam and attaching a second end of the semicircular ring to the third beam, where the first end and the second end are separated by an interior diameter distance of the semicircular ring.

The fastening the semicircular ring to the third beam may further comprise attaching a first support to a longitudinal mid-point of the third beam and to the semicircular ring.

The fastening the semicircular ring to the third beam may further comprise attaching a second support to the semicircular ring and the third beam and attaching a third support to the semicircular ring and the third beam, where the second and third supports are separated by the first support.

The positioning the first beam relative to the second beam may comprise positioning the first beam and the second beam in a jig, and the method may further comprise removing the solar panel assembly from the jig prior to transporting the solar panel assembly to the installation site.

The method may further comprise fastening proximate and distal longitudinal ends of the first beam and the second beam of the solar panel assembly to a longitudinally adjacent solar panel assembly.

The fastening the proximate and distal ends of the first and second beams may comprise fastening with at least one bolt and nut pair.

One of the proximate or distal ends of the first beam may have one of a male or female swaged connection, and the other one of the proximate or distal ends of the first beam may have the other one of the male or female swaged connection.

The third beam may comprise a first cooperating beam and a second cooperating beam, where the first and second cooperating beams are parallel extending and the flange is fastened to the third beam.

The post may comprise a saddle bracket positioned atop the post, where the saddle bracket comprises first and second opposing sidewalls each with a coaxial sidewall bore, where the rotatably attaching may comprise inserting the pin into the coaxial sidewall bores and the first bore to rotatably attach the solar panel assembly to the post.

According to another aspect of the disclosure, a method of installing a solar panel assembly that includes (i) a first beam and a second beam where the first and second beams are parallelly spaced and separated by and fastened to a third beam perpendicularly positioned between the first and second beams, (ii) a plurality of purlins fastened to and perpendicularly extending between the first beam and the second beam, (iii) a semicircular ring fastened to the third beam, where the semicircular ring includes teeth extending radially away from the third beam, and (iv) a plurality of photovoltaic panels between adjacent ones of the plurality of purlins to form the solar panel assembly, the method of installing the solar panel assembly comprising lifting the solar panel assembly and rotatably attaching it to a post by inserting a pin into a first bore in a flange extending from the third beam and into a second bore in the post, where the first and second bores are coaxial such that the solar panel assembly has a range of rotational motion about the pin; and fastening proximate and distal ends of the first and second beams to distal and proximate ends of an adjacent solar panel assembly.

The fastening proximate and distal ends of the first and second beams to the distal and proximate ends of the adjacent solar panel assembly may comprise making a swaged connection between adjacent distal and proximate ends.

The method may further comprise transporting the solar panel assembly to an operating site where the lifting is performed.

According to yet another aspect of the present disclosure, a method of installing a solar panel assembly that includes (i) a first beam and a second beam where the first and second beams are parallelly spaced and separated by and fastened to a third beam perpendicularly positioned between the first and second beams, (ii) a plurality of purlins fastened to and perpendicularly extending between the first beam and the second beam (iii) a semicircular ring fastened to the third beam, where the semicircular ring includes teeth extending radially away from the third beam, and (iv) a plurality of photovoltaic panels between adjacent ones of the plurality of purlins to form the solar panel assembly, the method of installing the solar panel assembly comprising rotatably attaching the solar panel assembly to a post by inserting a pin into a first bore in a flange extending from the third beam and into a second bore in the post, where the first and second bores are coaxial such that the solar panel assembly has a range of rotational motion about the pin, and fastening proximate and distal ends of the first and second beams to distal and proximate ends of an adjacent solar panel assembly.

The fastening proximate and distal ends of the first and second beams to the distal and proximate ends of the adjacent solar panel assembly may comprise making a swaged connection between adjacent distal and proximate ends.

The method may comprise transporting the solar panel assembly to an operating site where the rotatably attaching and fastening is performed.

The foregoing features and the operation of the invention will become more apparent in light of the following description and the accompanying drawings.

DETAILED DESCRIPTION

Figure 1:
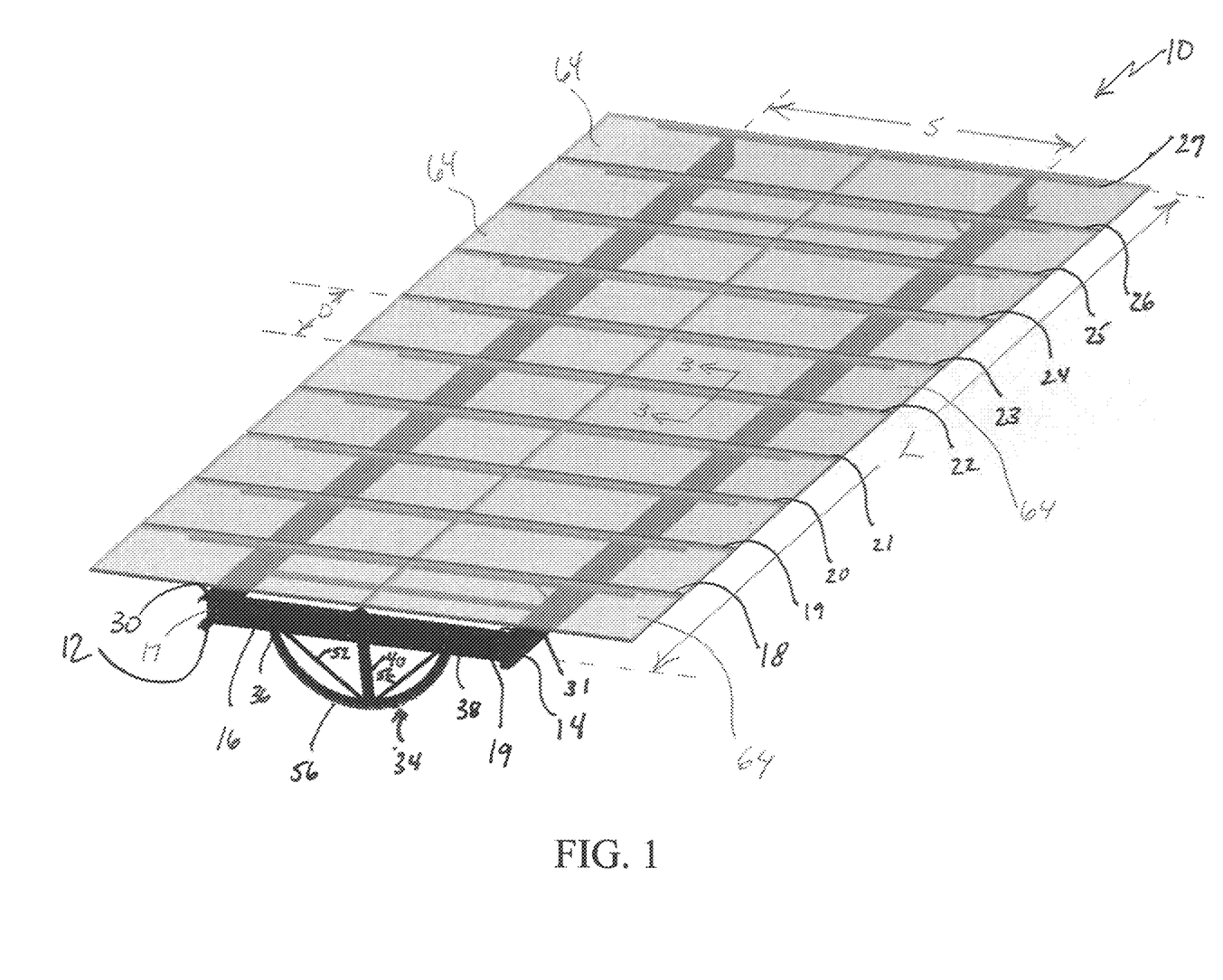
FIG. 1 illustrates a first perspective view of a solar panel assembly with the photovoltaic modules shown as transparent for ease of illustration of the underlying structure.
Figure 2:
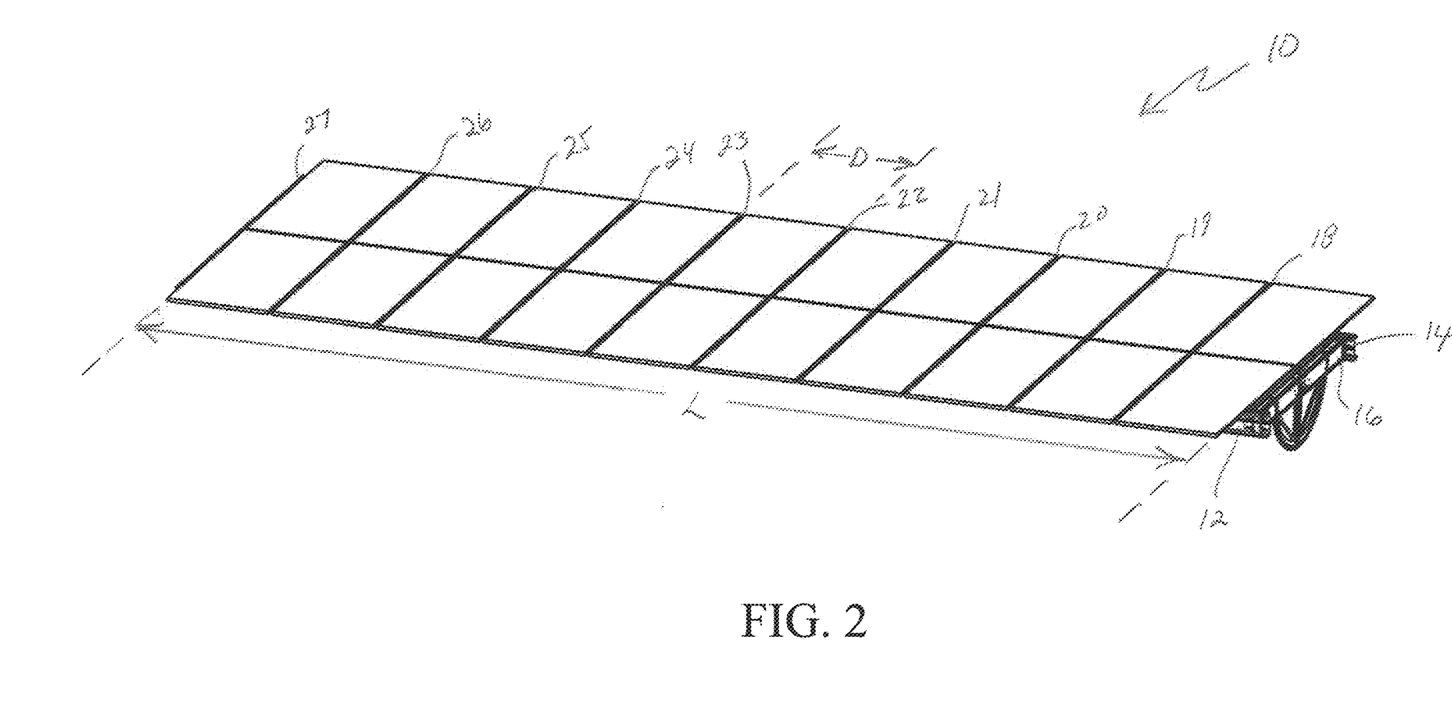
FIG. 2 illustrates a second perspective view of the solar panel assembly.

FIG. 1 illustrates a first perspective view of a solar panel assembly 10. FIG. 2 illustrates a second perspective view of the solar panel assembly 10. Referring to FIGS. 1 and 2, the solar panel assembly 10 includes a first beam 12 and a second beam 14, which are parallel and lengthwise extending. The beams 12, 14 may be metallic, such as for example, cold formed steel. However, it is contemplated that the beams 12, 14 may be non-metallic. The beams 12, 14 are often referred to as north-south beams since the beams are typically arranged in a utility scale solar power plant to extend generally in the north-south direction. The assembly 10 also includes a third beam 16, which is fastened to the first and second beams 12, 14, respectfully. For example, at a first end 17 the third beam 16 may be fastened to the first beam 12, and at a second end 19 the third beam 16 may be fastened to the second beam 14. The third beam 16 may be fastened to the first and second beams 12, 14 using one or more fasteners, such as for example, a threaded bolt and nut. In one embodiment, the first and second beams 12, 14 may have a length L of about 30-50 feet, preferably about 30-40 feet and are spaced a distance S. The distance S is a dependent upon the assembly arrangement, for example, whether a 1P, 2P or 3P tracker. In the embodiment illustrated in FIGS. 1 and 2 the length of the first and second beams 12, 14 is sufficient for an assembly 10 that includes ten (10) lengthwise adjacent photovoltaic panels, which are each typically 40 inches wide. The term adjacent shall mean situated near, close to, or adjoining.

Figure 3:
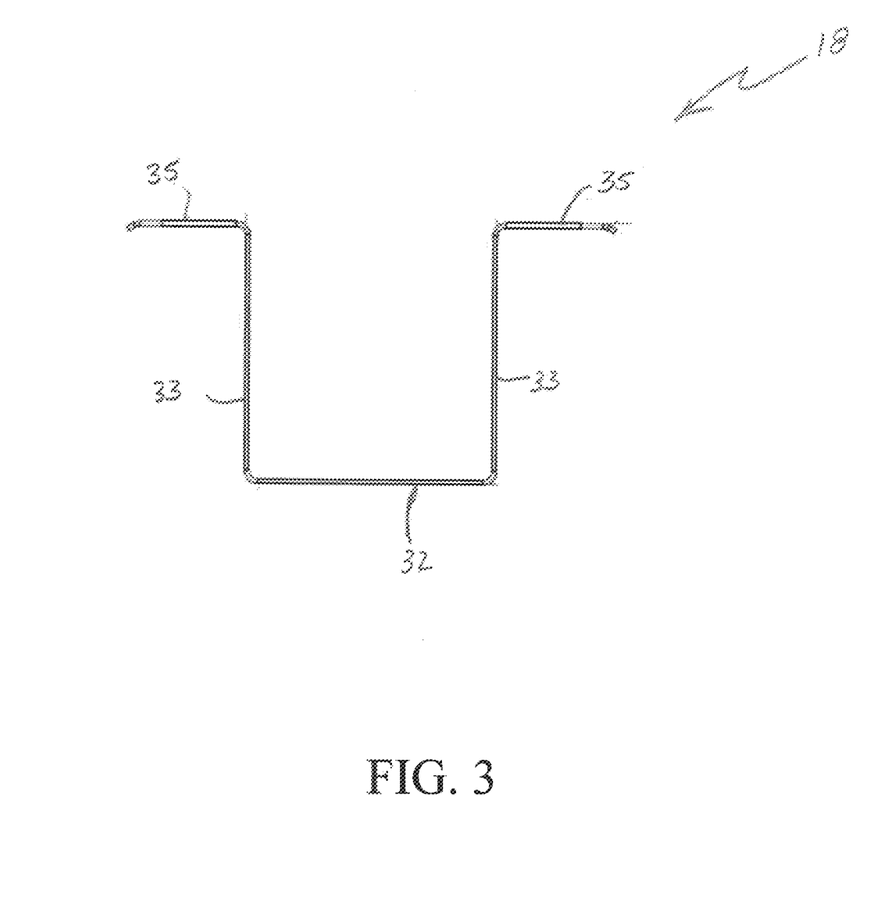
FIG. 3 illustrates a cross-sectional shape of a purlin taken along the line 3-3 in FIG. 1.

The assembly 10 also includes a plurality of purlins 18-27 that extend perpendicularly between the first and second beams 12, 14. Each purlin 18-27 is connected to the first and second beams 12, 14 and spaced a distance D from an adjacent purlin. Each purlin may include a cross-section as shown in FIG. 3, which is taken along line 3-3 in FIG. 1. Each purlin may be fastened to a top surface 30-31 of each of the first and second beams 12, 14, respectively. Each purlin may be fastened to the first and second beams 12, 14, for example, with a threaded bolt and nut. Referring to FIG. 3, each purlin may include a web 32 with first and second sidewalls 33 and flanges 35 extending from a respective sidewall 33. The flanges of the purlins hold the adjacent photovoltaic panels in place.

Figure 4:
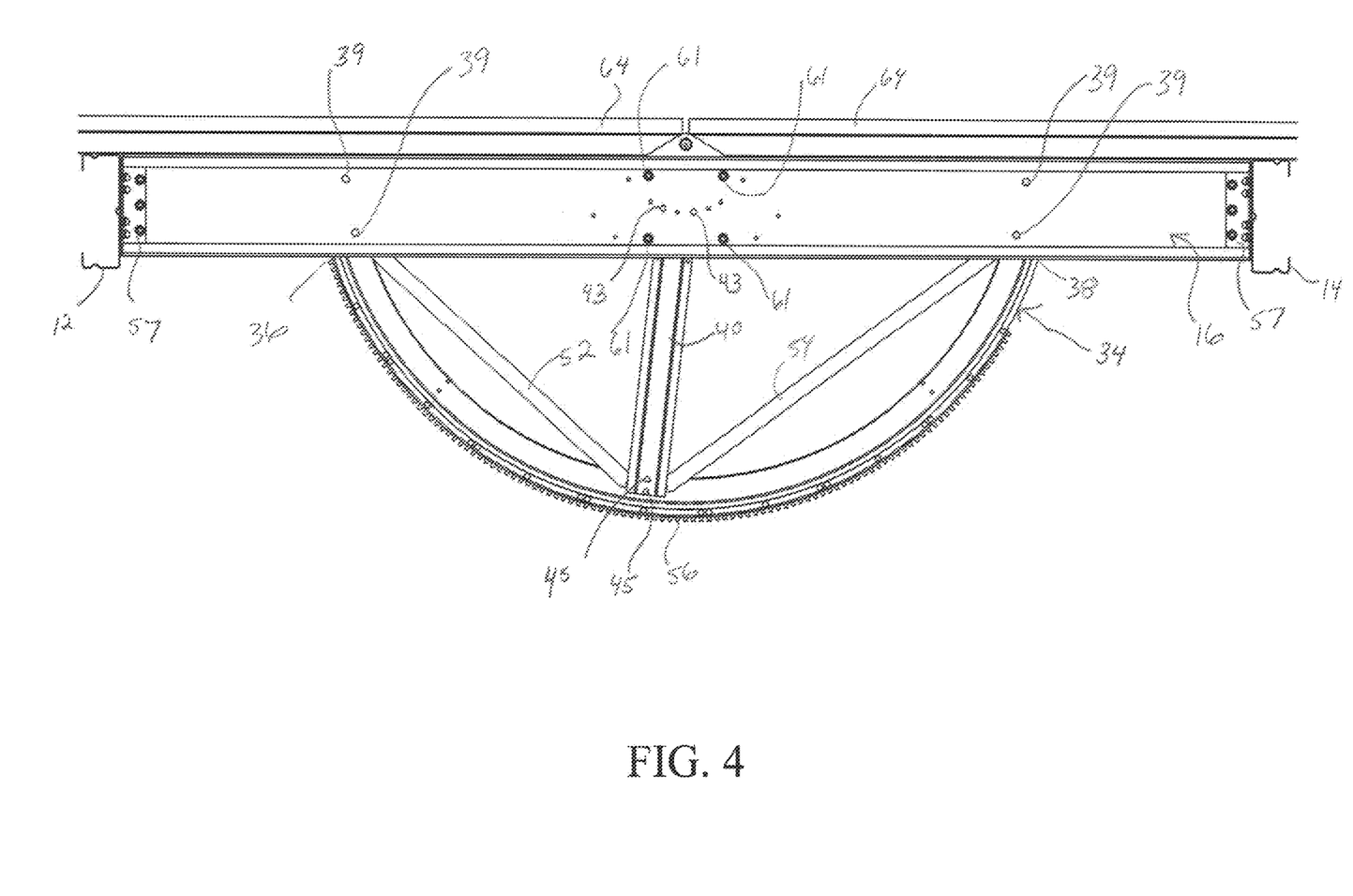
FIG. 4 is a pictorial illustration of a semicircular ring of the solar panel assembly attached to a third beam.
Figure 5:
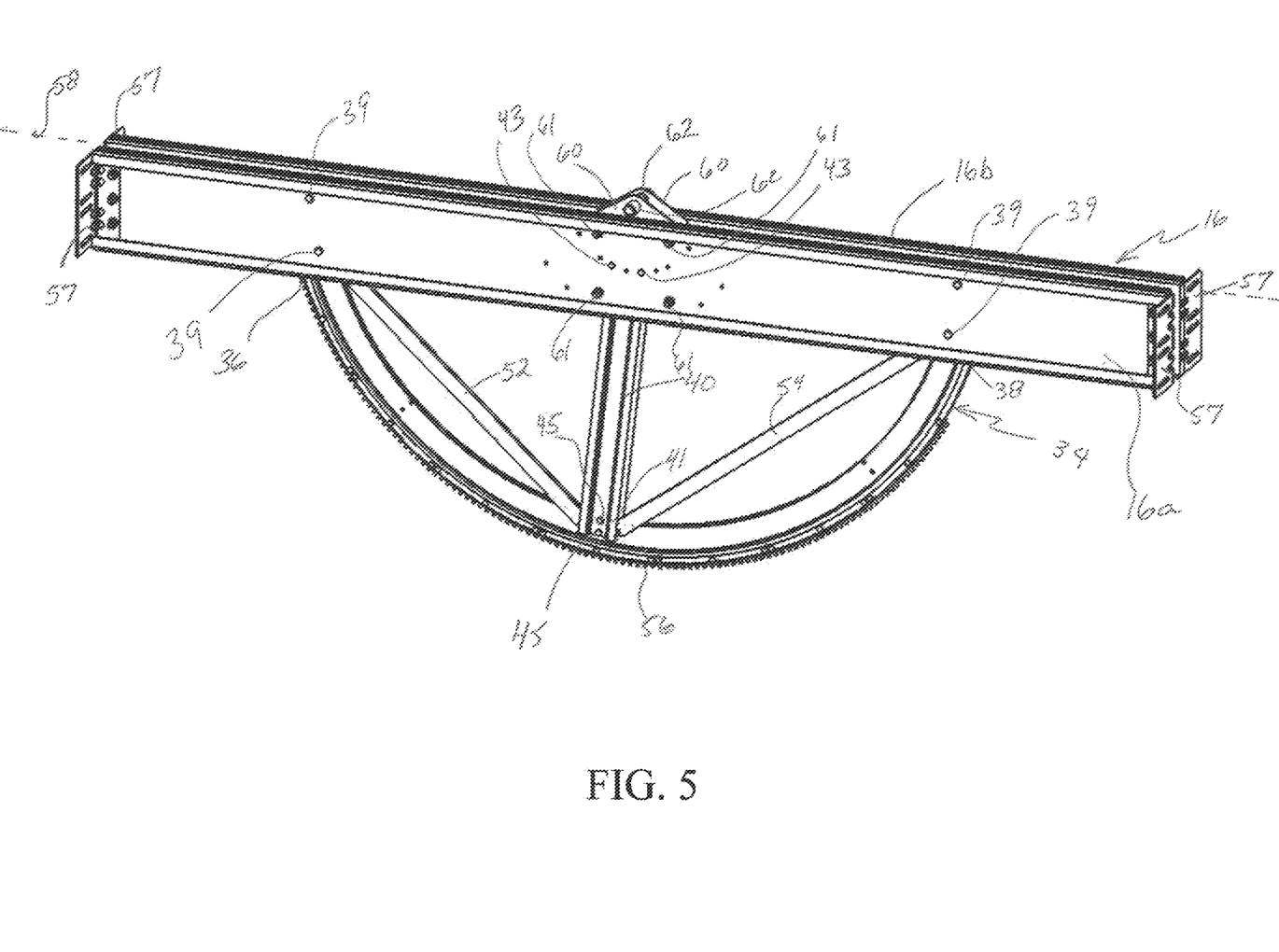
FIG. 5 is a perspective illustration of the semicircular ring of the solar panel assembly attached to the third beam.

FIG. 4 is a pictorial illustration of a semicircular ring 34 of the solar panel assembly 10 attached to the third beam 16, and FIG. 5 is a perspective illustration of the semicircular ring 34 of the solar panel assembly attached to the third beam 16. Referring to FIGS. 1, 2, 4 and 5, the semicircular ring 34 may be fastened (e.g., with threaded bolts and nuts) to the third beam 16 at a first end 36 of the semicircular ring 34 and at a second end 38 of the semicircular ring. The first end and the second end 36, 38, respectively, may be separated along the third beam 16 by an interior diameter distance DR of the semicircular ring 34. The ring 34 may be attached at the first and second ends 36, 38 with fasteners 39.

A first support 40 may also be used to attach the ring 34 to the third beam 16. For example, at its first longitudinal end the first support 40 may be attached to a longitudinal mid-point of the third beam 16 using fasteners 43, and a second longitudinal end 41 of the first support 40 may be attached to the semicircular ring 34 with fasteners 45. In a preferred embodiment the second longitudinal end 41 of the first support 40 may be connected to the ring 34 at a position slightly offset from the circumferential mid-point of the ring to align the first support 40 with a drive train (not shown) used to engage the ring. However, it is contemplated that the first support 40 may also be fastened to the ring 34 at the circumferential mid-point of the ring.

For further support of the ring 34 (e.g., to tension the ring), the assembly 10 may also include a second support 52

(e.g., a rod) that is attached (e.g., via fasteners 45) to the ring 34 at the position slightly offset from the circumferential mid-point of the ring and attached to the third beam 16. In addition, a third support 54 (e.g., a rod) may be attached to the semicircular ring 34 and the third beam 16, but on the opposite side of the first support 40 than the second support 52. This attachment may also be made, for example, with one or more threaded bolts and nuts, such as fasteners 45.

Referring to FIGS. 4 and 5, the semicircular ring 34 includes a plurality of teeth 56 extending radially away from the third beam 16 along the radial exterior of the semicircular ring 34. The teeth 56 of the ring gear may engage cooperating teeth of a gear (not shown) to rotate the semicircular ring 34 and thus the solar panel assembly 10 as part of a solar tracker.

Referring to FIG. 5, the third beam 16 may for formed by two cooperating beams 16a, 16b, which each includes brackets 57 at their distal and proximate ends along axis 58. The brackets 57 connect the third beam 16 to the first and second beams 12, 14 (see FIGS. 1 and 2), using for example a plurality of threaded bolts and nuts. In one embodiment, each of the cooperating beams 16a, 16b of the third beam includes a flange 60 with a bore 62 extending through the flange coaxial with the lengthwise extending first and second beams 12, 14 (FIG. 1). The flange(s) 60 may be unitary with third beam or attached thereto via fasteners 61. A pin may be inserted through the bores 62 to rotatably attach the assembly 10 (FIGS. 1 and 2) to a post (not shown). Attachment of the assembly 10 to the post will be discussed herein below with respect to FIGS. 10-12. The cooperating beams 16a, 16b of the third beam 16 and the ring 34 may be secured, for example, with a plurality of the threaded bolts and nuts. It is contemplated that a plurality of cooperating beams may be used to form the third beam. Of course, the third beam may also be a unitary structure.

Referring again to FIGS. 1-2, photovoltaic panels 64 are mounted and fastened between the purlins. FIGS. 1 and 2 illustrate a 2-Up Portrait arrangement, but the method of the present disclosure is not so limited and it is contemplated that the method may be used for the installation of various other panel arrangements (e.g., 1P, 3P, et cetera).

Figure 6:
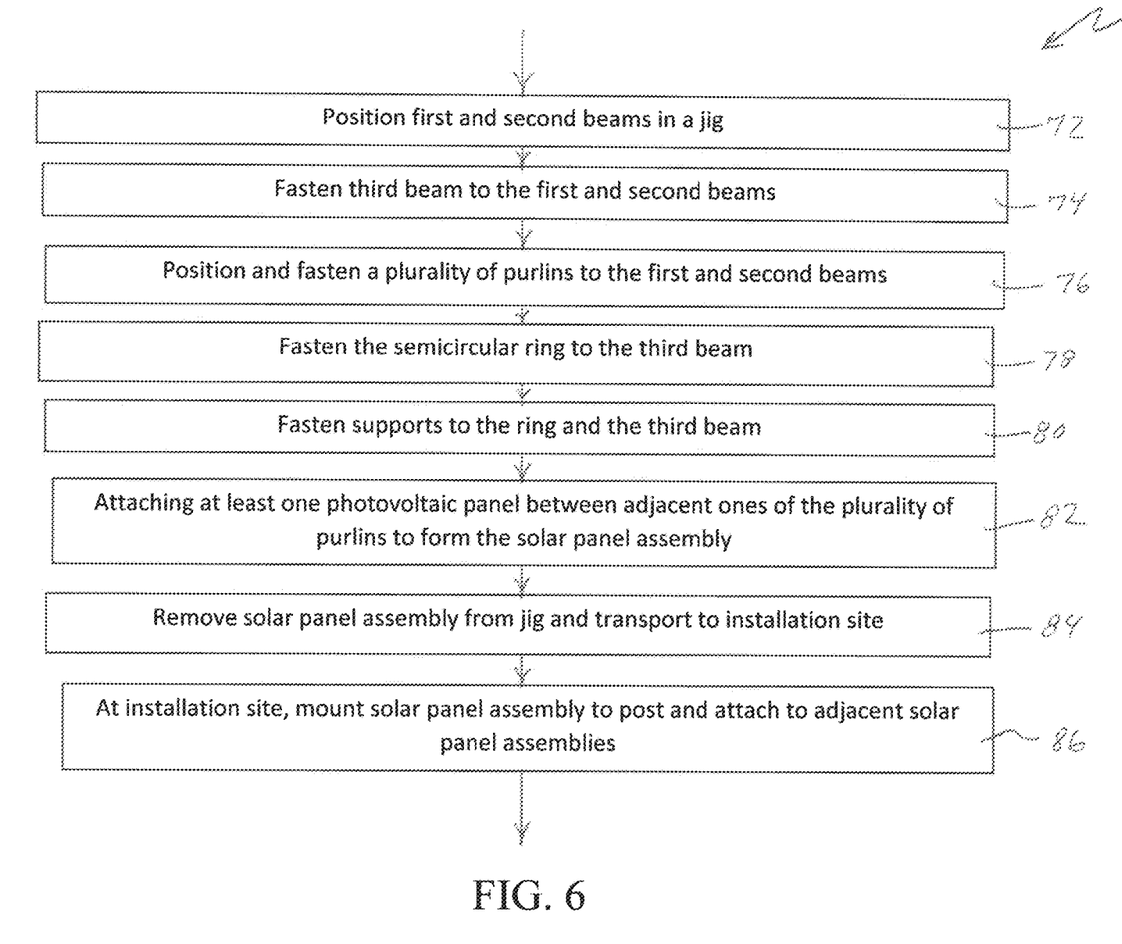
FIG. 6 is a flow chart illustration of a method of assembling the solar panel assembly and operably installing it.

FIG. 6 is a flow chart illustration of a method 70 of assembling the solar panel assembly 10, transporting it, and operably installing it at its operating location. In a first step 72, the first and second beams 12, 14 are positioned in a jig (not shown). The jig facilitates positioning the first and second beams 12, 14 with respect to one another. For example, the jig positions the first and second beams so they are parallel and positioned the distance S apart (see FIG. 1), and the longitudinal ends of the first and second beams 12, 14 align. When so positioned in the jig, in a second step 74 the third beam 16 is fastened to the first and second beams 12, 14, for example as shown in FIGS. 1 and 2. Referring to FIGS. 4-5, the third beam 16 may be fastened to the first and second beams 12, 14 using the brackets 57 and fasteners, such as for example thread bolts and nuts.

Referring still to FIG. 6, in a next step 76, using the jig the plurality of purlins are positioned perpendicular to the first and second beams 12, 14, spaced the distance D from adjacent purlins and fastened to the first and second beams 12, 14 (see FIG. 1). In step 78, the ring 34 is then fastened to the third beam 16 (see FIGS. 4-5). In step 80, the supports (e.g., 40, 50, 52) are attached to the ring 34 and the third beam 16 (see FIGS. 4-5). In step 82, the photovoltaic panels are mounted and fastened between the panels to form the solar panel assembly 10 (see FIGS. 1-2).

In step 84 the solar panel assembly 10 is then removed from the jig, and the solar panel assembly is transported to an installation site. The solar panel assembly may be lifted from the jig using a crane, placed on a flatbed trailer, and then transported to the installation site.

Figure 7:
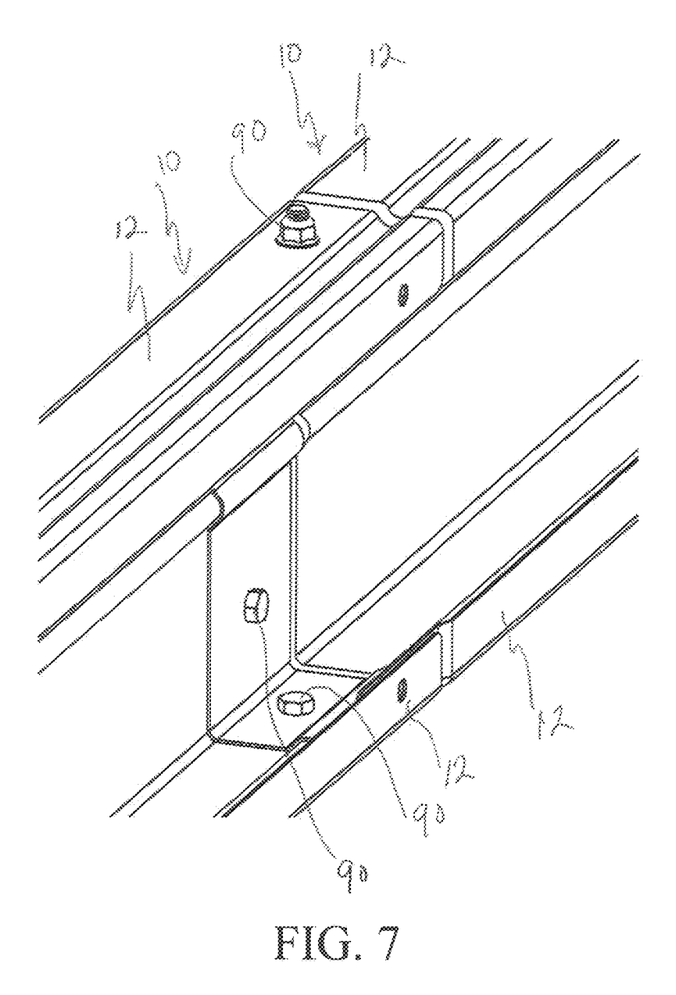
FIG. 7 is a front perspective view of first beams of adjacent solar panel assemblies fastened together.
Figure 8:
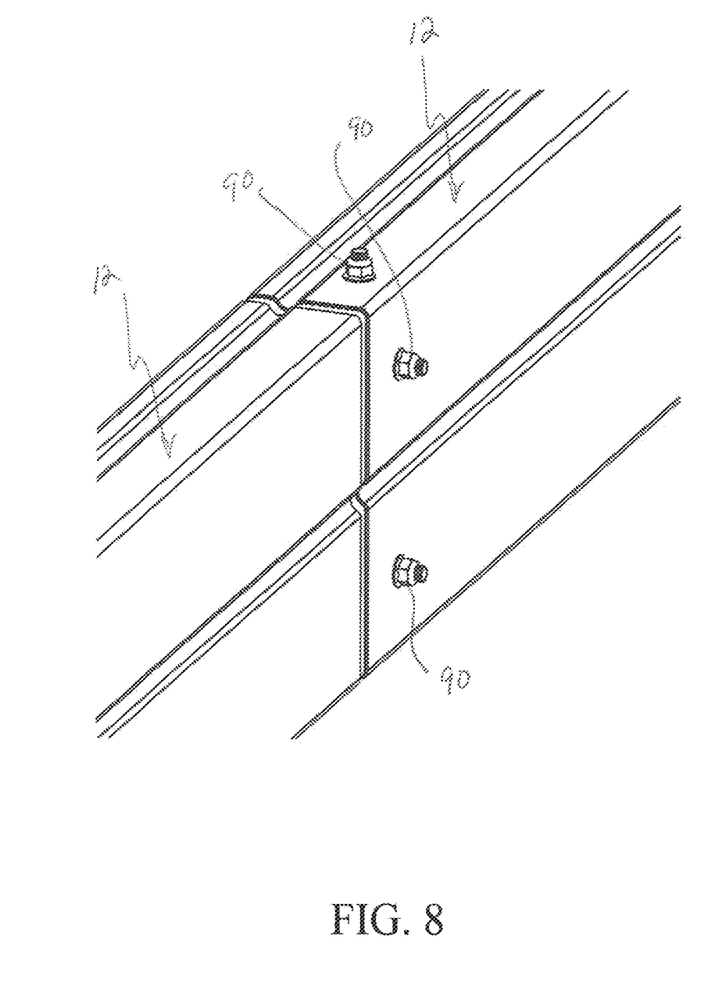
FIG. 8 is a rear perspective view of the first beams of the adjacent solar panel assemblies of FIG. 7 fastened together.
Figure 9:
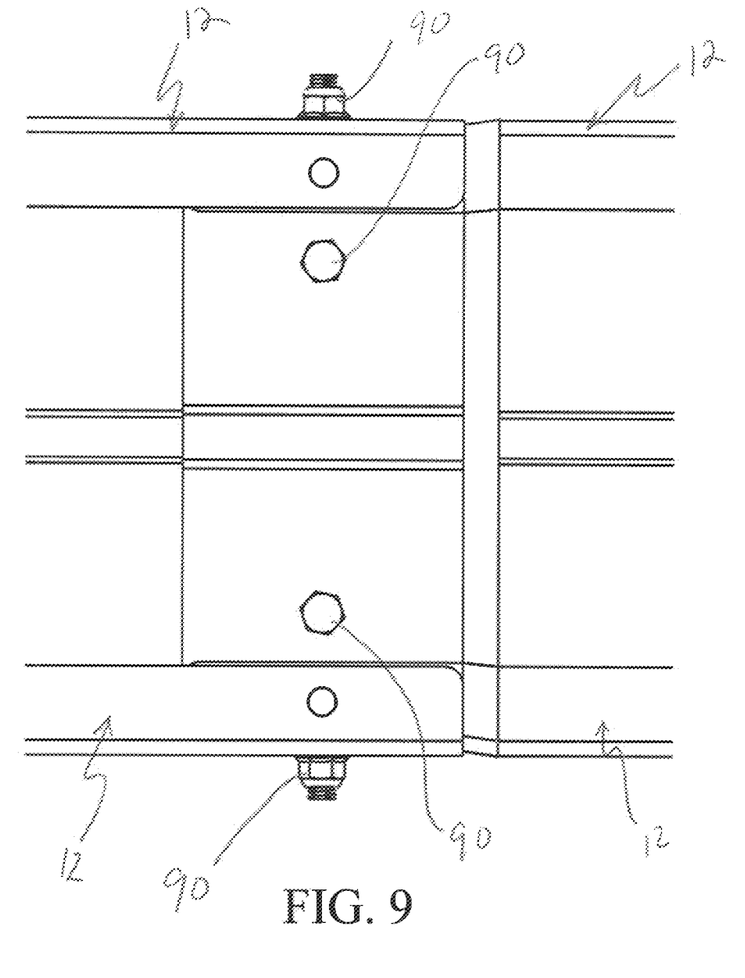
FIG. 9 is a side view of the first beams of the adjacent solar panel assemblies of FIGS. 7 and 8 fastened together.

When the solar panel assembly arrives at the installation site, in step 86, a crane lifts the assembly 10 from the flatbed trailer and positions it to be rotatably connected to the post (see FIGS. 10-12) and connected to longitudinally adjacent solar panel assemblies 10 (see FIGS. 7-9).

FIG. 7 is a front perspective view of first beams 12 of adjacent solar panel assemblies 10 fastened together. Each of the first and second beams 12 may include cooperating swaged ends (e.g., a male end and a female end). This allows lengthwise adjacent beams 12, 14 to be connected with a swage coupling and then secured in place with fasteners 90. FIG. 8 is a rear perspective view of the first beams 12 of the adjacent solar panel assemblies 10 of FIG. 7 fastened together. FIG. 9 is a side view of the first beams 12 of the adjacent solar panel assemblies 10 of FIGS. 7 and 8 fastened together. Although FIGS. 7-9 illustrate the connection of longitudinally adjacent first beams, the connection between longitudinally adjacent second beams is similar (e.g., a swaged connection with fasteners to lock in place).

Figure 10:
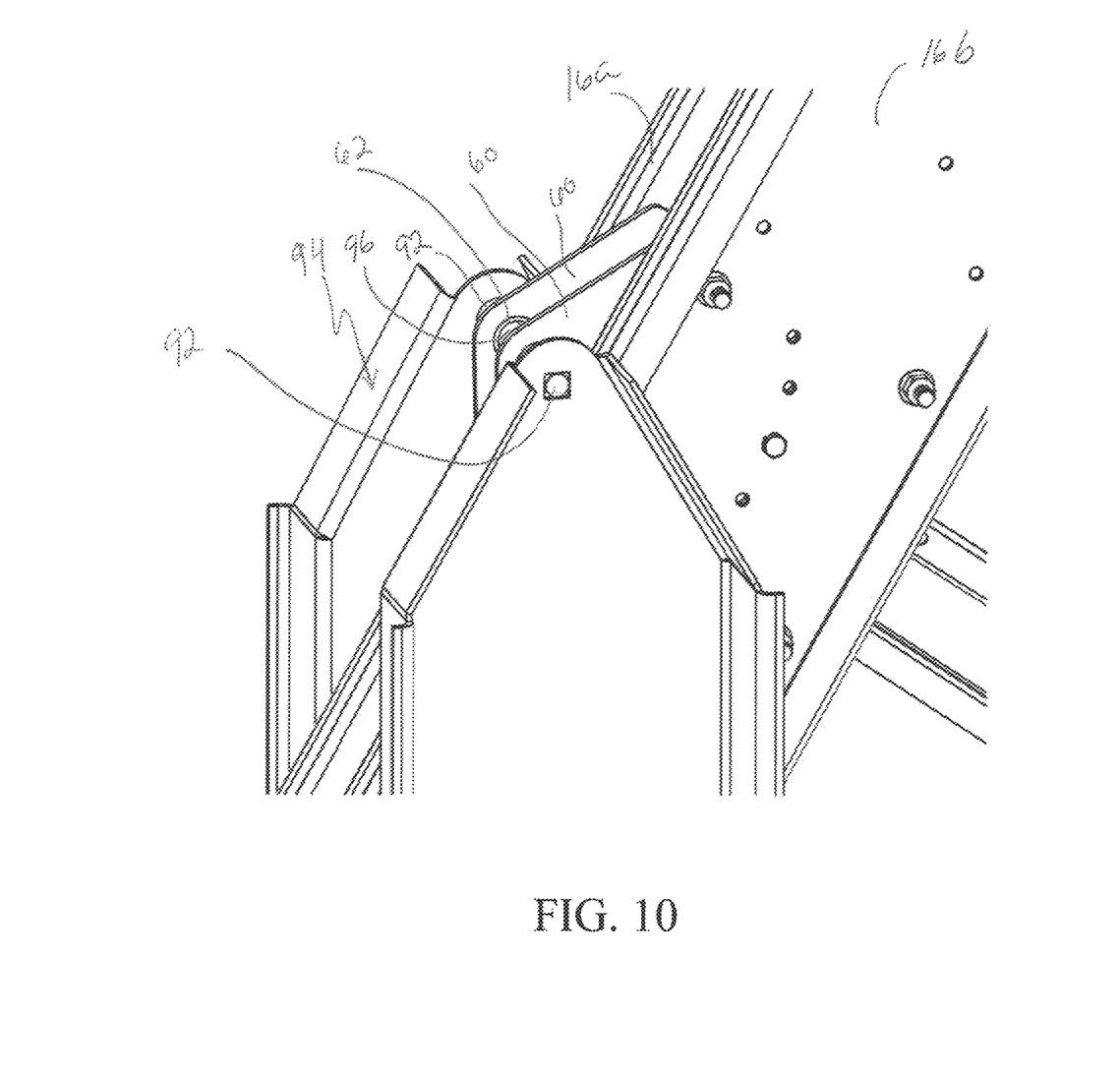
FIG. 10 is detailed perspective side view of the co-axial bores of the flanges aligned with bores in a saddle bracket located atop a post, and a pin inserted through the bores to rotatably connect the solar panel assembly to the post via the saddle bracket.
Figure 11:
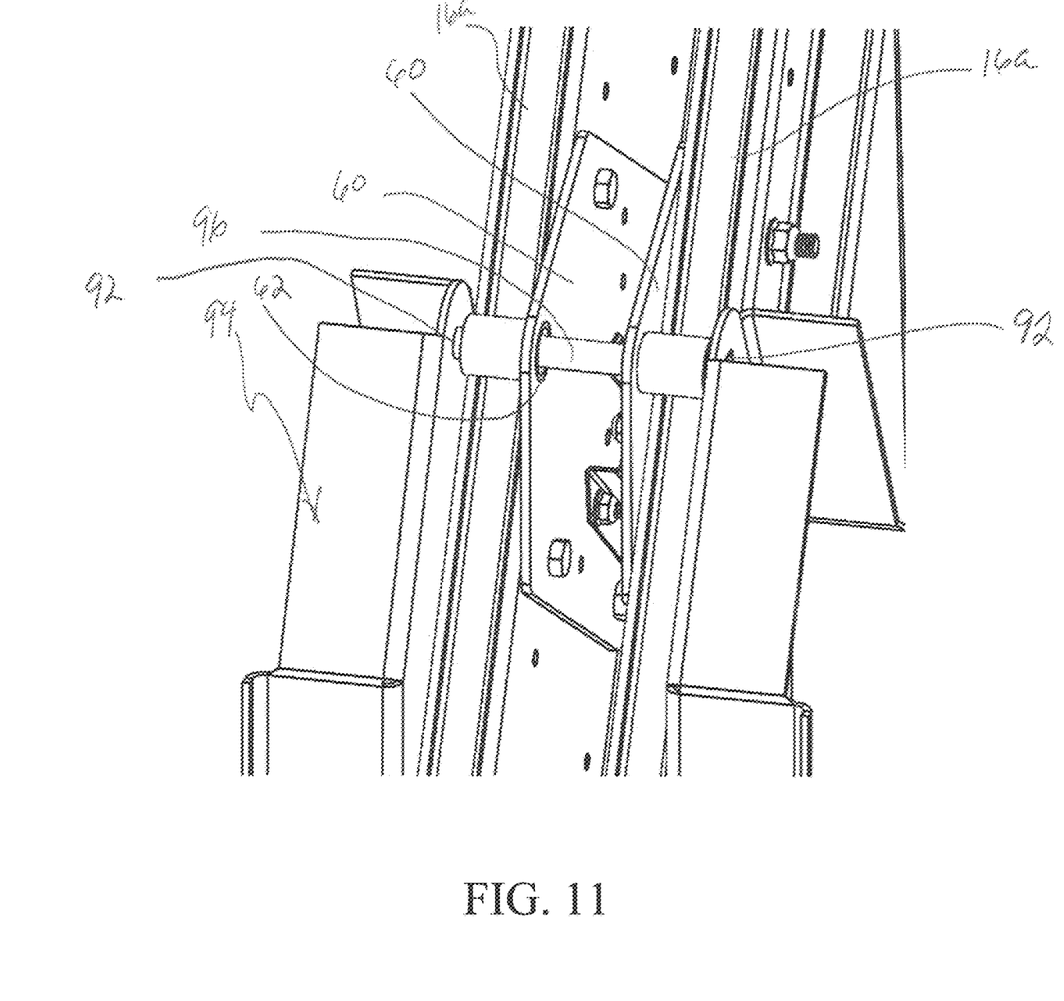
FIG. 11 is a detailed perspective side view of the co-axial bores of the flanges aligned with bores in the saddle bracket located atop the post, and the pin through the bores to rotatably connect the solar panel assembly.
Figure 12:
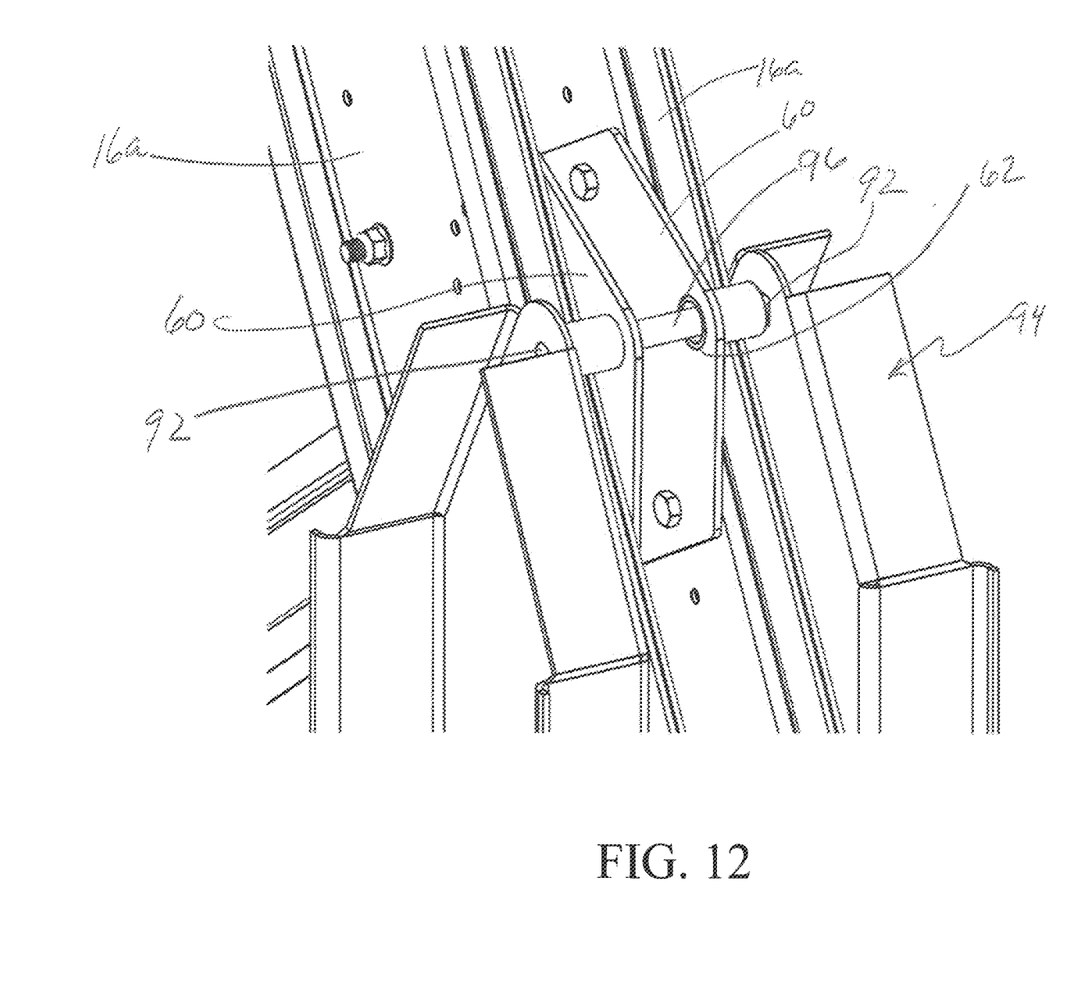
FIG. 12 is a detailed perspective side view of the co-axial bores of the flanges aligned with bores in the saddle bracket located atop the post, and the pin through the bores to rotatably connect the solar panel assembly.

FIG. 10 is detailed perspective side view of the co-axial bores 62 of the flanges 60 aligned with bores 92 in a saddle bracket 94 located atop a post, and a pin 96 is inserted through the bores 62 and 92 to rotatably connect the solar panel assembly 10 transported to the operating position to the post via the saddle bracket 94. FIG. 11 is a detailed perspective side view of the co-axial bores 62 of the flanges 60 aligned with bores 92 in the saddle bracket 94 located atop the post, and the pin 96 through the bores 62 and 92 to rotatably connect the solar panel assembly 10. FIG. 12 is a detailed perspective side view of the co-axial bores 62 of the flanges 60 aligned with bores 92 in a saddle bracket 94 located atop the post, and a pin 96 through the bores 62 and 92 to rotatably connect the solar panel assembly 10.

The method of the present disclosure provides an innovative way to assemble and install a single axis tracker. Away from the location that solar panel assembly will be mounted to the post, the solar panel assembly is first assembled and then transported as an assembled structure to the operating position. There the solar panel assembly 10 is lifted into place, the first and second beams are connected to longitudinally adjacent beams of the adjacent assembly with several fasteners to hold the assemblies in place (e.g., fasteners 90 in FIGS. 7-9) and the bore(s) 62 in the flange(s) 60 are aligned with bore (92) on the post and a pin inserted to establish the pivotal connection for the ring 34. Thus connections for only three connection points need to be made at the operating position. A first connection at the location of rotation, a second connection at adjacent first beams and the third connection at adjacent second beams. These connections can be quickly made with the pin 96 at the location of the rotation (see FIGS. 10-12) and the fasteners 90 that longitudinally secure adjacent first and second beams (see FIGS. 7-9). Notably, steps 72-84 in FIG. 6 can be performed at ground level, eliminating the need for fall protection. In the case of 2-Up Portrait trackers this reduces the install time since the large majority of mechanical assembly work is performed at ground level, the resultant assembly transported to the operating position, and then quickly installed in its operation position via the three connection points.

Although the method of the present disclosure is presented using a semicircular ring to rotate the solar panel assembly 10, it is contemplated that the method of the present disclosure may also be used for tracker systems that use other drive systems, such as for example, actuator linkage systems. In addition, rather than using fasteners such as threaded bolts and nuts, a skilled person will recognize that the various connections/attachments disclosed herein may be made using various techniques, including for example, welding, adhesives, et cetera.

While the connection between the assembly 10 and post is preferably made by a pin passing through the bores 60 in the assembly 10 and a cooperating coaxial bore in an assembly on the post, the present disclosure is not limited to a pin connection. It is contemplated that a secure and rotatable connection can be made between the assembly 10 and the post using for example a bearing, a hinge, or other mechanism that provides a mounting for rotation. In addition, the method of the present disclosure is not limited to the order of the steps set forth in FIG. 6.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A method of assembling and installing a solar panel assembly, comprising:
   positioning a first beam relative to a second beam, where the first beam and the second beam are parallelly spaced;
   fastening a third beam to and perpendicularly between the first beam and the second beam;
   fastening a plurality of purlins to and perpendicularly between the first beam and the second beam;
   fastening a semicircular ring to the third beam, where the semicircular ring includes teeth extending radially away from the third beam;
   attaching at least one photovoltaic panel between adjacent ones of the plurality of purlins to form the solar panel assembly formed by the first, second and third beams, the plurality of purlins, the semicircular ring and the at least one photovoltaic panel;
   transporting the solar panel assembly to an installation site; and
   lifting the solar panel assembly and rotatably attaching it to a post by inserting a pin into a first bore in a flange extending from the third beam and into a second bore in the post, where the first and second bores are coaxial such that the solar panel assembly has a range of rotational motion about the pin.

2. The method of claim 1, where the fastening the semicircular ring to the third beam further comprises attaching a first end of the semicircular ring to the third beam and attaching a second end of the semicircular ring to the third beam, where the first end and the second end are separated by an interior diameter distance of the semicircular ring.

3. The method of claim 2, where the fastening the semicircular ring to the third beam further comprises attaching a first support to a longitudinal mid-point of the third beam and to the semicircular ring.

4. The method of claim 3, where the fastening the semicircular ring to the third beam further comprises attaching a second support to the semicircular ring and the third beam and attaching a third support to the semicircular ring and the third beam, where the second and third supports are separated by the first support.

5. The method of claim 1, where the positioning first beam relative to the second beam comprises positioning the first beam and the second beam in a jig, and the method further comprises removing the solar panel assembly from the jig prior to transporting the solar panel assembly to the installation site.

6. The method of claim 1, further comprising fastening proximate and distal longitudinal ends of the first beam and second beam of the solar panel assembly to a longitudinally adjacent solar panel assembly.

7. The method of claim 6, where the fastening the proximate and distal ends of the first and second beams comprises fastening with at least one bolt and nut pair.

8. The method of claim 7, where one of the proximate or distal ends of the first beam has one of a male or female swaged connection, and the other one of the proximate or distal ends of the first beam has the other one of the male or female swaged connection.

9. The method of claim 1, where the third beam comprises a first cooperating beam and a second cooperating beam, where the first and second cooperating beams are parallel extending and the flange is fastened to the third beam.

10. The method of claim 1, where the post comprises a saddle bracket positioned atop the post, where the saddle bracket comprises first and second opposing sidewalls each with a coaxial sidewall bore, where the rotatably attaching comprises inserting the pin into the coaxial sidewall bores and the first bore to rotatably attach the solar panel assembly to the post.

11. A method of installing a solar panel assembly that includes (i) a first beam and a second beam where the first and second beams are parallelly spaced and separated by and fastened to a third beam perpendicularly positioned between the first and second beams, (ii) a plurality of purlins fastened to and perpendicularly extending between the first beam and the second beam, (iii) a semicircular ring fastened to the third beam, where the semicircular ring includes teeth extending radially away from the third beam, and (iv) a plurality of photovoltaic panels between adjacent ones of the plurality of purlins to form the solar panel assembly, the method of installing the solar panel assembly comprising:
   lifting the solar panel assembly and rotatably attaching it to a post by inserting a pin into a first bore in a flange extending from the third beam and into a second bore in the post, where the first and second bores are coaxial such that the solar panel assembly has a range of rotational motion about the pin; and
   fastening proximate and distal ends of the first and second beams to distal and proximate ends of an adjacent solar panel assembly.

12. The method of claim 11, where the fastening proximate and distal ends of the first and second beams to the distal and proximate ends of the adjacent solar panel assembly comprises making a swaged connection between adjacent distal and proximate ends.

13. The method of claim 12, further comprising transporting the solar panel assembly to an operating site where the lifting is performed.

14. A method of installing a solar panel assembly that includes (i) a first beam and a second beam where the first and second beams are parallelly spaced and separated by and fastened to a third beam perpendicularly positioned between the first and second beam, (ii) a plurality of purlins fastened to and perpendicularly extending between the first beam and the second beam, (iii) a semicircular ring fastened to the third beam, where the semicircular ring includes teeth extending radially away from the third beam, and (iv) a plurality of photovoltaic panels between adjacent ones of the plurality of purlins to form the solar panel assembly, the method of installing the solar panel assembly comprising:

rotatably attaching the solar panel assembly to a post by inserting a pin into a first bore in a flange extending from the third beam and into a second bore in the post, where the first and second bores are coaxial such that the solar panel assembly has a range of rotational motion about the pin; and fastening proximate and distal ends of the first and second beams to distal and proximate ends of an adjacent solar panel assembly.

15. The method of claim 14, where the fastening proximate and distal ends of the first and second beams to the distal and proximate ends of the adjacent solar panel assembly comprises making a swaged connection between adjacent distal and proximate ends.

16. The method of claim 15, further comprising transporting the solar panel assembly to an operating site where the rotatably attaching and fastening is performed.

* * * * *